US012443136B2

(12) United States Patent
Imada et al.

(10) Patent No.: US 12,443,136 B2
(45) Date of Patent: Oct. 14, 2025

(54) SENSOR HOLDER, UNIT, AND IMAGE FORMING APPARATUS

(71) Applicants: Takahiro Imada, Kanagawa (JP); Yoshikuni Sasaki, Kanagawa (JP); Takuya Seshita, Kanagawa (JP)

(72) Inventors: Takahiro Imada, Kanagawa (JP); Yoshikuni Sasaki, Kanagawa (JP); Takuya Seshita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 33 days.

(21) Appl. No.: 18/419,567

(22) Filed: Jan. 23, 2024

(65) Prior Publication Data

US 2024/0255892 A1 Aug. 1, 2024

(30) Foreign Application Priority Data

Jan. 31, 2023 (JP) ................................ 2023-012861

(51) Int. Cl.

| | |
|---|---|
| ***G03G 15/20*** | (2006.01) |
| ***G01K 1/14*** | (2021.01) |
| ***G03G 21/16*** | (2006.01) |

(52) U.S. Cl.

CPC ........... *G03G 21/1647* (2013.01); *G01K 1/14* (2013.01); *G03G 15/2017* (2013.01); *G03G 15/2064* (2013.01); *G03G 21/1652* (2013.01)

(58) Field of Classification Search

CPC ............... G03G 15/20; G03G 15/2017; G03G 15/2039; G03G 15/2064; G03G 21/1647; G03G 21/1652; G01K 1/14

See application file for complete search history.

(56) References Cited

U.S. PATENT DOCUMENTS

| | | | | |
|---|---|---|---|---|
| 2020/0096934 | A1 * | 3/2020 | Makita | G03G 21/1647 |
| 2020/0183310 | A1 * | 6/2020 | Tanto | G03G 15/2039 |
| 2022/0124932 | A1 | 4/2022 | Ohtsuka | |
| 2024/0160132 | A1 * | 5/2024 | Seshita | G03G 15/2039 |

FOREIGN PATENT DOCUMENTS

| | | | |
|---|---|---|---|
| JP | 2020-051774 | A | 4/2020 |
| JP | 2022-066782 | A | 5/2022 |

* cited by examiner

*Primary Examiner* — Sophia S Chen

(74) *Attorney, Agent, or Firm* — XSENSUS LLP

(57) ABSTRACT

A sensor holder is provided that includes a single snap fitter, and a regulator. The single snap fitter holds a sensor. The regulator regulates a harness extending from the sensor by a regulation force such that the sensor is pushed to the snap fitter by the regulation force.

10 Claims, 11 Drawing Sheets

SENSOR HOLDER, UNIT, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-012861, filed on Jan. 31, 2023, in the Japan Patent Office, the entire disclosure of which is hereby incorporated by reference herein.

BACKGROUND

Technical Field

Embodiments of the present disclosure relate to a sensor holder, a unit, and an image forming apparatus.

Related Art

There is a conventionally known sensor holder including a snap fitter that holds a sensor.

As such a sensor holder as above, there is a sensor holder including two snap fitters that hold a senor. Specifically, a harness extends from the sensor, and one of the snap fitters holds the side of location of an end of the sensor in a direction orthogonal to the direction in which the harness extends. The other of the snap fitters holds the side of location of the other end of the sensor in the direction orthogonal to the direction in which the harness extends.

SUMMARY

According to embodiments of the present disclosure, a sensor holder is provided that includes a single snap fitter, and a regulator. The single snap fitter holds a sensor. The regulator regulates a harness extending from the sensor by a regulation force such that the sensor is pushed to the snap fitter by the regulation force.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
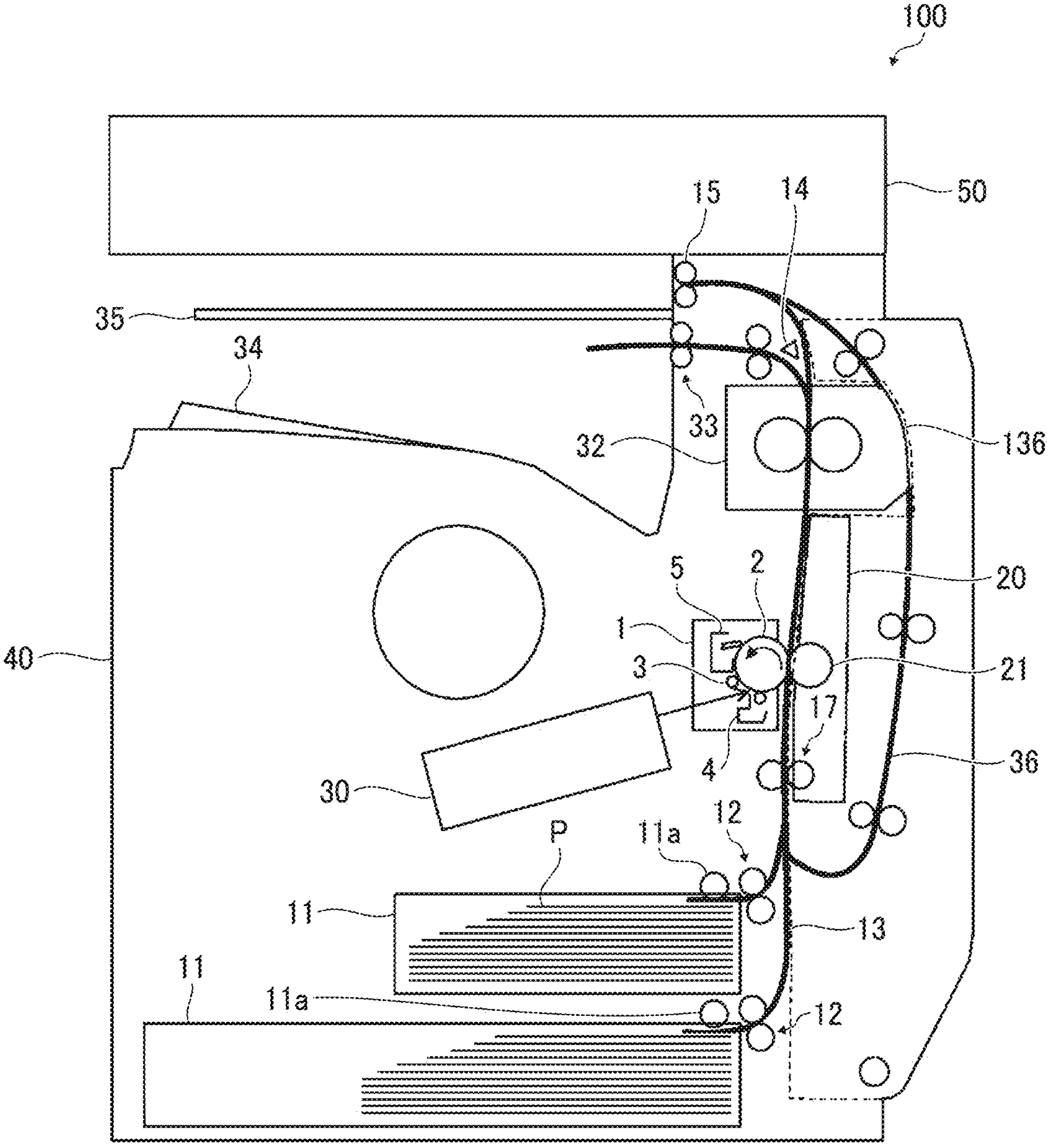
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure will be described below based on the drawings. Note that alterations and modifications of the present invention in the scope of the claims can be made easily by those skilled in the art for other embodiments and such alterations and modifications are to be included in the scope of the claims. The following descriptions are some exemplary embodiments of the present invention and thus do not limit the scope of the claims.

An image forming apparatus according to an embodiment of the present disclosure that forms an image in an electrophotographic manner will be described below.

FIG. 1 is a schematic view of the configuration of an image forming apparatus 100 according to an embodiment of the present disclosure.

The image forming apparatus 100 includes a main body 40 having an upper portion to which an image reading device 50 is attached.

A process cartridge 1 is provided inside the main body 40. The process cartridge 1 includes a photoconductor 2 as a latent image bearer, a charging device 3 that is disposed around the photoconductor 2 and serves as an effector to the photoconductor 2, a developing device 4, and a cleaning device 5. The process cartridge 1 is detachably attached to the main body 40. Since the photoconductor 2, the charging device 3, the developing device 4, and the cleaning device 5 are unitized as the process cartridge 1, work such as replacement or maintenance is facilitated. The positional accuracy between each member can be highly maintained, leading to an improvement in the quality of an image to be formed.

A transfer device 20 as a transferor includes a transfer roller 21 and one of a pair of registration rollers 17. Under pressing, the transfer roller 21 abuts on the circumferential face of the photoconductor 2. A fixing device 32 that is a detachable unit is provided above the transfer device 20. The main body 40 is provided with a laser writing device 30 as a latent image former. The laser writing device 30 includes a laser light source, a scanning rotatable polygonal mirror, a polygon motor, and an fθ lens. The main body includes a multistage sheet cassette 11 that houses sheets P, such as transfer paper or OHP films.

In order to make a copy with the image forming apparatus 100 having such a configuration, a user presses a start switch. Then, the image reading device 50 reads the content of an original set thereto. Simultaneously, the charging device 3 charges the surface of the photoconductor 2 uniformly while a photoconductor driving motor is rotating the photoconductor 2. Next, in accordance with the content of the original read by the image reading device 50, the laser writing device 30 performs a writing process with irradiation of laser light. Then, after formation of an electrostatic latent image on the surface of the photoconductor 2, the developing device 4 performs adhesion of toner to visualize (develop) the electrostatic latent image.

Simultaneously with the press to the start switch by the user, sheets P selected from the multistage sheet cassette 11 are fed by a feeding roller 11*a*. Next, a separator 12 separates and feeds the sheets P one-by-one to a supply path 13. The sheet P fed to the supply path 13 butts against the pair of registration rollers 17 and then stops. Then, at the timing of rotation of a toner image, resulting from visualization, on the photoconductor 2, the sheet P is fed to a transfer nip formed between the transfer roller 21 and the photoconductor 2 that have abutted on each other.

The toner image on the photoconductor 2 is transferred, by the transfer roller 21, to the sheet P fed to the transfer nip. The cleaning device 5 removes and cleans the residual toner on the photoconductor 2 after image transfer. A discharge device removes the residual potential on the photoconductor 2 from which the residual toner is removed. Then, a standby state follows for the next image forming with the charging device 3. The residual toner removed by the cleaning device 5 is conveyed to a waste-toner bottle.

Meanwhile, the sheet P subjected to the image transfer is guided to the fixing device 32 and then the toner image is fixed to the sheet P due to application of heat and pressure. In single-sided image forming for image formation on one side of the sheet P, the sheet P subjected to the image fixing is guided to an ejection roller 33 by a bifurcating claw 14. Then, the sheet P is ejected onto and stacked on an ejection stack 34 by the ejection roller 33.

In double-sided image forming, the sheet P subjected to the image fixing is guided to a reverse roller 15 by the bifurcating claw 14 and then is conveyed, by the reverse roller 15, to a reverse tray 35 disposed above the ejection stack 34. Before the rear end in the direction of conveyance of the sheet P passes through the reverse roller 15, the reverse roller 15 rotates backward such that the sheet P is switchback-conveyed to a resupply path 36 as a reverse conveyance path. The sheet P conveyed to the resupply path 36 is conveyed to the pair of registration rollers 17 by a plurality of conveyance rollers disposed on the resupply path 36. Then, similarly to the above, the sheet P is fed to the transfer nip, followed by a transfer of a toner image to the back face as a second face of the sheet. Then, the sheet P is ejected onto the ejection stack 34 through the fixing device 32.

In the present embodiment, the fixing device 32 has a cover provided with a guide 136 that guides a sheet on the resupply path 36. Thus, the resupply path 36 is disposed close to the fixing device 32, so that the image forming apparatus is compact in size.

Figure 2:
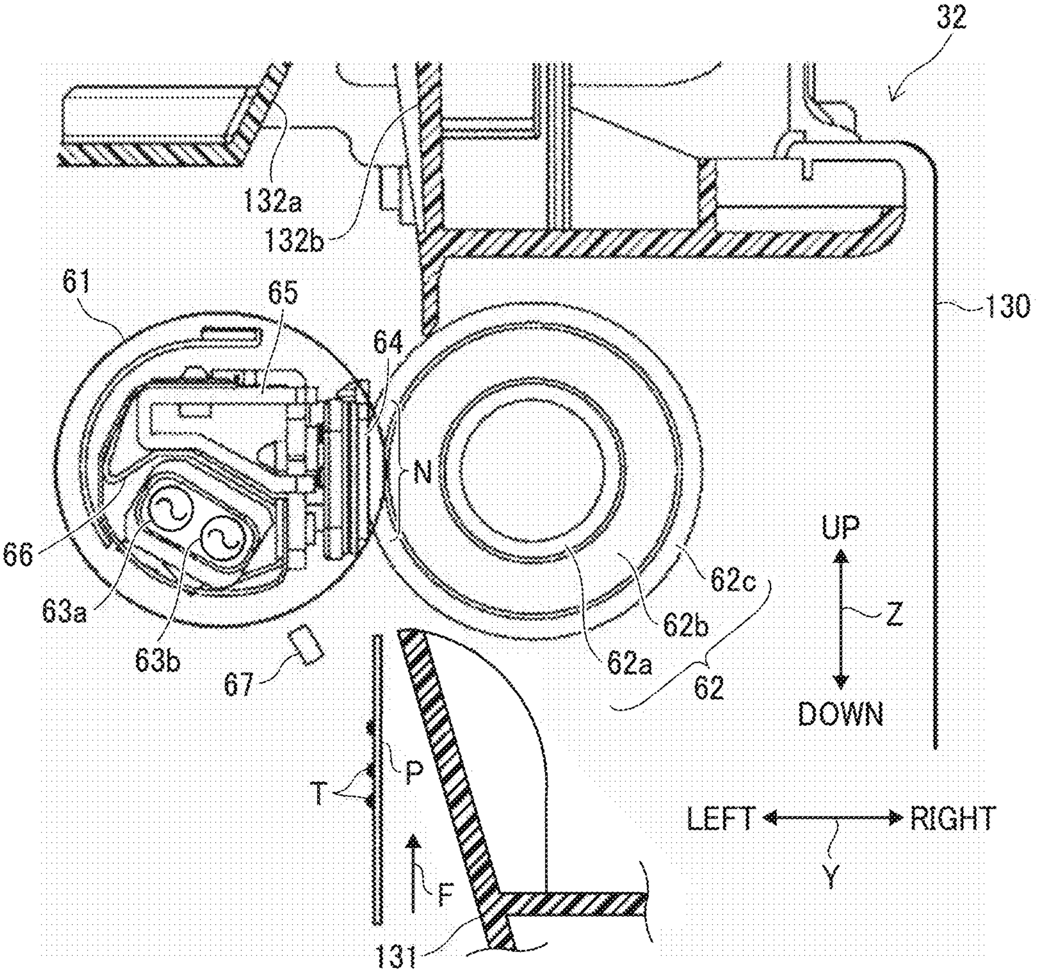
FIG. 2 is a schematic view of a fixing device.

FIG. 2 is a schematic view of the configuration of the fixing device 32.

The fixing device 32 as a unit includes a fixing belt 61 as a heatable endless member that has flexibility and is rotatable while being heated. The fixing device 32 is used to fix, by fusion and permeation with heat and pressure, a transferred toner image T borne on a sheet P.

The fixing device 32 includes a pressure roller 62 as a pressure member that applies pressure to the fixing belt 61 in abutment with the fixing belt 61 to form a nip N (hereinafter may be referred to as "fixing nip"). In the present embodiment, inside the fixing belt 61, provided are a main heater 63*a* and a sub-heater 63*b* that each serve as a heat source including a halogen lamp that heats, as a target, the part out of the nip N of the fixing belt 61, specifically, the region opposite to the nip N of the fixing belt 61 that runs circumferentially.

The main heater 63*a* and the sub-heater 63*b* are each a halogen heater. The fixing belt 61 is directly heated from the inner circumferential side due to radiant heat from the heaters 63*a* and 63*b*. The heaters 63*a* and 63*b* may be each based on induction heating (IH) or may be each a resistance heating element or carbon heater, provided that the fixing belt 61 can be heated.

The main heater 63*a* has a heat generation distribution indicating that the amount of heat generation is larger at its center in the width direction of the sheet than at its both ends in the width direction of the sheet. Meanwhile, the sub-heater 63*b* has a heat generation distribution indicating that the amount of heat generation is larger at its both ends in the width direction of the sheet than at its center in the width direction of the sheet.

Inside the fixing belt 61, provided is a nip formation member 64 as a base for nip formation disposed inside the fixing belt 61. Inside the fixing belt 61, provided are a stay 65 that supports the nip formation member 64 and a reflective member 66 that reflects, to the fixing belt 61, heat emitted from the heaters 63*a* and 63*b*.

The shape of the nip N due to the nip formation member 64 is flat, but this is not limiting. For example, the shape of the nip N may be concave along the circumferential face of the pressure roller 62. In a case where the nip formation member 64 is concave in shape along the circumferential face of the pressure roller 62, the leading end of the sheet P that is passing through the nip N comes to the side of location of the pressure roller 62, leading to an improvement in the separability from the fixing belt 61.

Because the fixing belt 61 has an inner circumferential face coated with lubricant, such as fluorine grease or silicone oil, the lubricant is interposed between the nip formation member 64 and the inner circumferential face of the fixing belt 61, leading to a reduction in sliding torque.

A temperature detection sensor 67 is provided on the side of location of the sheet P to enter the nip and detects the temperature of the fixing belt 61. The detected temperature is used in feedback processing to the heaters 63*a* and 63*b*. Note that an arrow F in FIG. 2 indicates the direction of conveyance of the sheet P.

The fixing belt 61 is an endless belt that is thin and shaped like a sleeve and has flexibility. The fixing belt 61 includes a base and a release layer located on the surface of the base. As the base, used is a metal material, such as nickel or stainless steel (SUS), or a resin material, such as polyimide. As the release layer, used is perfluoroalkoxy alkane (PFA) or polytetrafluoroethylene (PTFE) having releasability to toner.

The pressure roller 62 includes a cored bar 62*a*, an elastic layer 62*b*, such as foam silicone rubber, silicone rubber, or fluorine rubber, provided on the surface of the cored bar 62*a*, and a release layer 62*c*, such as PFA or PTFE, provided on the surface of the elastic layer 62*b*. In abutment with the fixing belt 61 due to pressing to the side of location of the fixing belt 61 by pressure, the pressure roller 62 abuts on the nip formation member 64 through the fixing belt 61.

The elastic layer 62*b* of the pressure roller 62 is compressed at the abutment between the pressure roller 62 and the fixing belt 61. Thus, due to pressure to the fixing belt 61, the nip formation member 64 ensures the nip N having a predetermined width.

The pressure roller 62 is driven rotationally by a driving source, such as a motor, with which the main body 40 is provided. When the pressure roller 62 is driven rotationally, its driving force is transmitted to the fixing belt 61 through the nip N, so that the fixing belt 61 rotates.

In the present embodiment, the pressure roller 62 is solid but may be hollow. In such a case, a heating source, such as a halogen heater, employing radiant heat may be disposed inside the pressure roller 62. Even in a case where the pressure roller 62 is hollow, desirably, an elastic layer having a thickness of 100 μm or more is provided. Providing no elastic layer causes a reduction in the thermal capacity of the pressure roller 62, leading to an improvement in fixability. However, in a case where unfixed toner is compressed for fixing, the minute asperities of the surface of the belt are transferred to an image. Thus, nonuniformity may occur in the gloss of the filled-in portion of the image. Thus, desirably, an elastic layer having a thickness of 100 μm or more is provided.

As a pipy metal used for a hollow roller, aluminum, iron, or stainless steel can be selected. In a case where a heat source is provided inside the pressure roller 62, in order to inhibit a support from being heated by radiant heat from the heat source, desirably, a thermal insulating layer is provided or a heat reflective face due to mirror finishing is provided on the surface of the support. As the heat source in such a case, instead of such a halogen heater as described above, an IH heater, a resistance heating element, or a carbon heater can be used.

As illustrated in FIG. 2, the fixing device 32 includes a pre-fixing guide 131 that guides, to the nip N, the sheet P to which the toner image T is transferred, and a pair of post-fixing guides 132*a* and 132*b* that guides the sheet P to which the toner image is fixed at the nip. The guides 131, 132*a*, and 132*b* may be integrated with a fixing cover 130 made of resin or may be independent from the fixing cover 130.

The fixing device 32 includes, outside the fixing belt 61, a safety device as a power breaker that detects an abnormal temperature of the surface of the fixing belt 61 to stop the power supply to the heaters.

Figure 3:
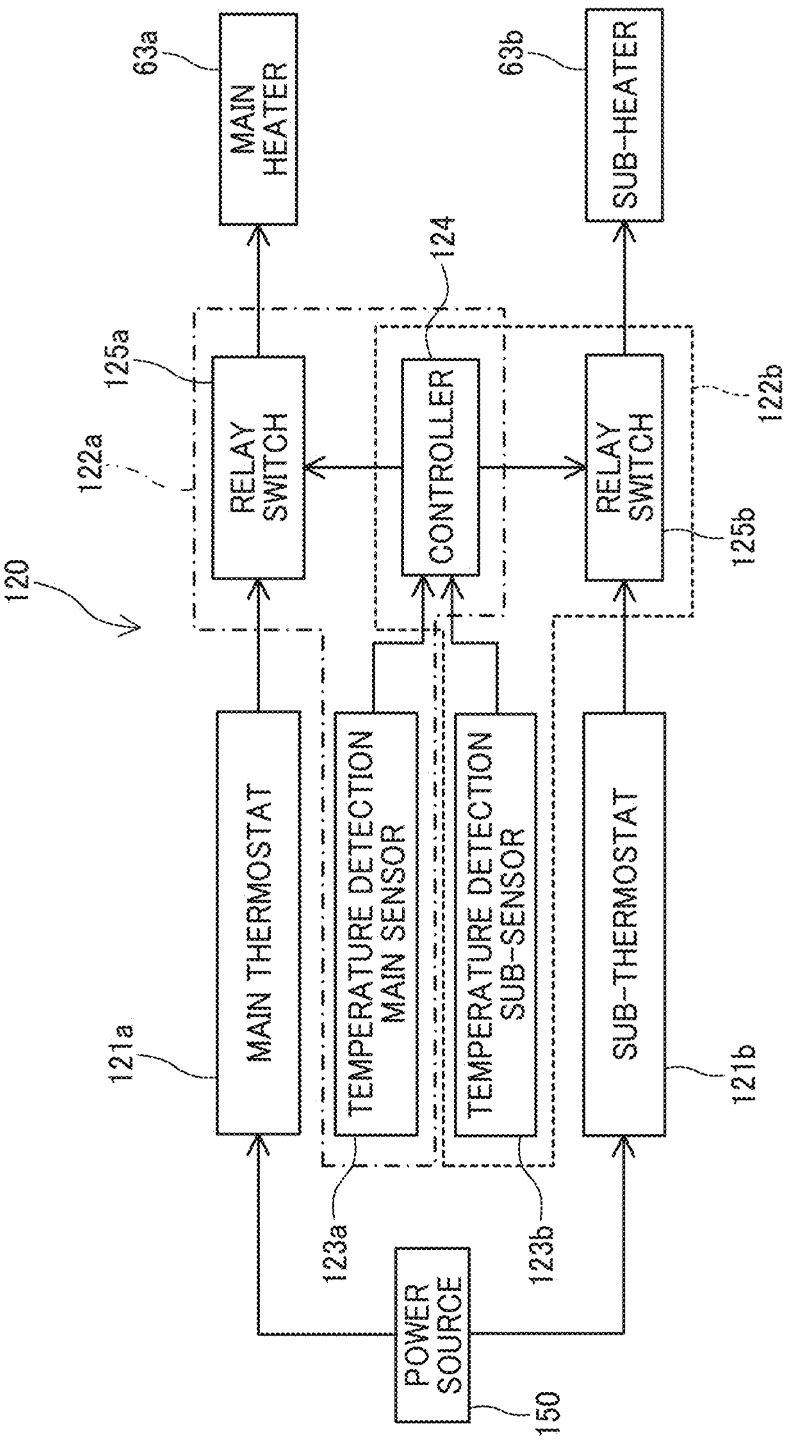
FIG. 3 is a block diagram of a safety device.

FIG. 3 is a block diagram of a safety device 120.

The safety device 120 includes a main thermostat 121*a* serving as a first main protector and a second main protector 122*a*, in order to block the power supply to the main heater 63*a*. The safety device 120 includes a sub-thermostat 121*b* serving as a first sub-protector and a second sub-protector 122*b*, in order to block the power supply to the sub-heater 63*b*.

The main thermostat 121*a* is provided in an electric main circuit that supplies the main heater 63*a* with power from a power source 150. When the temperature of the fixing belt 61 reaches a prescribed temperature or more, the main thermostat 121*a* blocks the power supply to the main heater 63*a*.

The sub-thermostat 121*b* is provided in an electric sub-circuit that supplies the sub-heater 63*b* with power from the power source 150. When the temperature of the fixing belt 61 reaches the prescribed temperature or more, the sub-thermostat 121*b* blocks the power supply to the sub-heater 63*b*.

The second main protector 122*a* includes a temperature detection main sensor 123*a*, a controller 124, and a relay switch 125*a* provided in the electric main circuit. When the temperature detection main sensor 123*a* detects that the temperature of the fixing belt 61 is not less than the prescribed temperature, the controller 124 turns off the relay switch 125*a* to block the power supply to the main heater 63*a*.

The second sub-protector 122*b* includes a temperature detection sub-sensor 123*b*, the controller 124, and a relay switch 125*b* provided in the electric sub-circuit. When the temperature detection sub-sensor 123*b* detects that the temperature of the fixing belt 61 is not less than the prescribed temperature, the controller 124 turns off the relay switch 125*b* to block the power supply to the sub-heater 63*b*.

The safety device 120 in the present embodiment includes two protectors per heater. Thus, even when one of two protectors breaks down, the other protector functions to block the power to the corresponding heater. Thus, in comparison to a case where a single protector is provided per heater, device protection can be carried out more reliably.

In the present embodiment, a thermostat protector and a protector including a temperature detection sensor are provided per heater, but a combination of protectors is not limited to this. Based on a device configuration, an appropriate combination of protectors may be made, such as a combination of a temperature fuse protector and a protector including a temperature detection sensor.

A protector including a temperature detection sensor blocks the power supply to the heater when the temperature detection sensor detects the prescribed temperature or more. Therefore, after the temperature of the fixing belt 61 reaches the prescribed temperature or more, such a protector including a temperature detection sensor as above blocks more promptly the power supply to the heater than a thermostat or a temperature fuse does. In particular, if the fixing device is less in thermal capacity and lower in power consumption, the rise rate of temperature of the fixing belt 61 is high. Thus, in a case where the temperature of the fixing belt 61 is not less than the prescribed temperature, the power supply to the heater requires more promptly blocking in order to ensure safety.

Therefore, preferably, at least one of two protectors is a protector including a temperature detection sensor. Even when the temperature of the fixing belt 61 reaches the prescribed temperature or more, the power supply to the heater can be blocked promptly, leading to a high level of safety.

Figure 4:
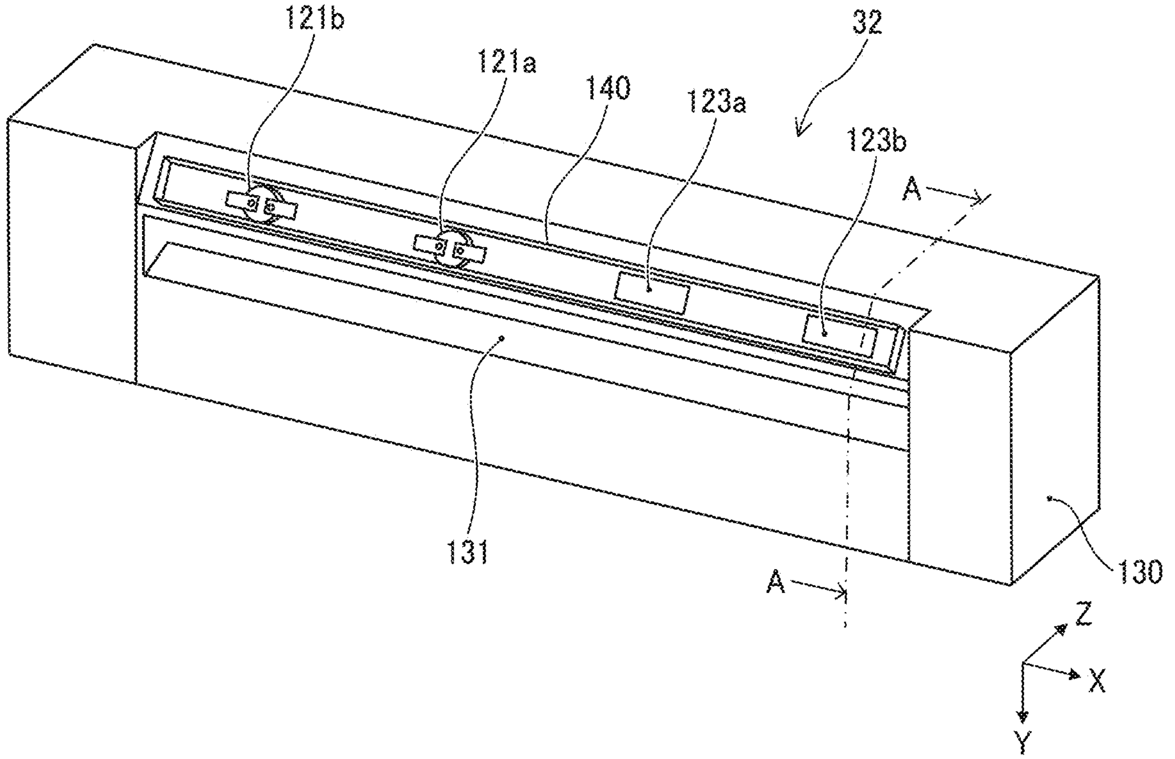
FIG. 4 is a schematic perspective view of the fixing device from below.
Figure 5:
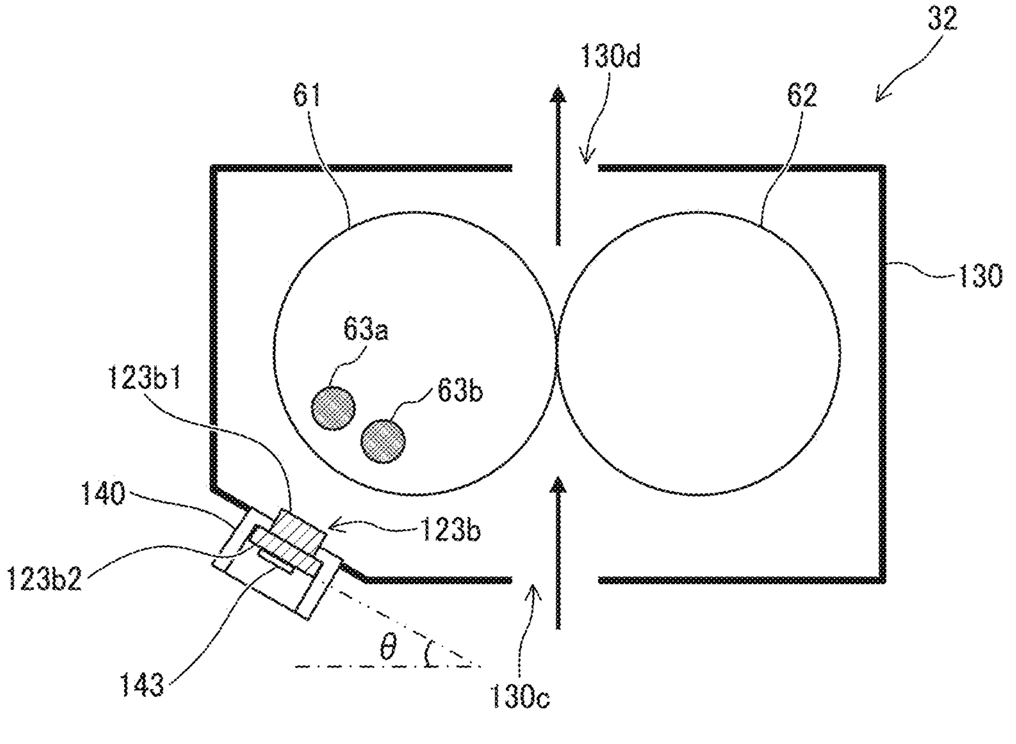
FIG. 5 is a cross-sectional view taken along line A-A of FIG. 4.

FIG. 4 is a schematic perspective view of the fixing device 32 from below. FIG. 5 is a cross-sectional view taken along line A-A of FIG. 4.

The fixing device 32 includes the fixing cover 130 as a molded resin product that covers the fixing belt 61 and the pressure roller 62. The fixing cover 130 includes an inlet 130*c* through which the sheet P having passed through a secondary transfer nip is delivered and an outlet 130*d* through which the sheet P having the toner image fixed thereto is ejected.

A holder 140 is attached to the fixing cover 130. The holder 140 holds the sub-thermostat 121*b*, the main thermostat 121*a*, the temperature detection main sensor 123*a*, and the temperature detection sub-sensor 123*b* in the safety device 120. Note that the holder 140 may be provided integrally with the fixing cover 130. Providing the holder 140 integrally with the fixing cover 130 enables a reduction in the number of components as an advantage. Integrating the holder 140 with the fixing cover on the outermost side of the fixing device 32 enables, as an advantage, easy obtainment of a configuration in which the temperature detection sensors 123*a* and 123*b* and the thermostats 121*a* and 121*b* are exposed outward from the fixing device 32 as described later.

The holder 140 made of resin material is boxy in shape and has a lower portion provided with an opening. The sub-thermostat 121*b*, the main thermostat 121*a*, the temperature detection main sensor 123*a*, and the temperature detection sub-sensor 123*b* are held in the holder 140.

As illustrated in FIG. 5, the temperature detection sub-sensor 123*b* has a detector 123*b*1 that penetrates through and is held by the holder 140. Similarly, the sub-thermostat 121*b*, the main thermostat 121*a*, and the temperature detection main sensor 123*a* each have a detector that penetrates through and is held by the holder 140.

The sub-thermostat 121*b*, the main thermostat 121*a*, the temperature detection sub-sensor 123*b*, and the temperature detection main sensor 123*a* are each required to detect abnormality more promptly. Thus, the sub-thermostat 121*b*, the main thermostat 121*a*, the temperature detection sub-sensor 123*b*, and the temperature detection main sensor 123*a* are disposed facing part of the fixing belt 61, in which the surface temperature of the fixing belt 61 usually reaches the highest temperature at the part. Specifically, the sub-thermostat 121*b*, the main thermostat 121*a*, the temperature detection sub-sensor 123*b*, and the temperature detection main sensor 123*a* are disposed facing the region that the fixing belt 61 has closest to the heaters 63*a* and 63*b*.

As described above, the main heater 63*a* has a heat generation distribution indicating that the amount of heat generation is larger at its center in the width direction of the sheet than at its both ends in the width direction of the sheet. The sub-heater 63*b* has a heat generation distribution indicating that the amount of heat generation is larger at its both ends in the width direction of the sheet than at its center in the width direction of the sheet. Therefore, as illustrated in FIG. 4, the sub-thermostat 121*b* and the temperature detection sub-sensor 123*b* are disposed on both sides in the axial direction (in the longitudinal direction of the holder 140). Then, the main thermostat 121*a* and the temperature detection main sensor 123*a* are disposed at the center in the axial direction (in the longitudinal direction of the holder 140).

In the present embodiment, as illustrated in FIG. 4, the temperature detection sensors 123*a* and 123*b* and the thermostats 121*a* and 121*b* in the safety device 120 are exposed outward from the fixing device 32. Thus, it can be visually verified whether or not the temperature detection sensors 123*a* and 123*b* and the thermostats 121*a* and 121*b* in the safety device 120 have been assembled correctly as a finished product.

The temperature detection sensors 123*a* and 123*b* and the thermostats 121*a* and 121*b* in the safety device 120 can be attached or detached from outside. Thus, in a case where any of the temperature detection sensors 123*a* and 123*b* and the thermostats 121*a* and 121*b* has not been assembled properly, reassembly can be carried out easily. The temperature detection sensors 123*a* and 123*b* and the thermostats 121*a* and 121*b* in the safety device 120 can be each replaced easily, leading to an enhancement in the workability of replacement.

In the present embodiment, the temperature detection main sensor 123*a* and the temperature detection sub-sensor 123*b* are exposed outward and thus are sensitive to the influence of environmental temperature. Thus, the temperature detection main sensor 123*a* and the temperature detection sub-sensor 123*b* are likely to fail in accurate temperature detection because of the influence of environmental temperature. Thus, in the present embodiment, the temperature detection main sensor 123*a* and the temperature detection sub-sensor 123*b* are each a thermistor having a temperature compensation function. The thermistor having a temperature compensation function includes a detector that detects the surface temperature of the fixing belt and a compensation detector that detects the ambient temperature of the thermistor. Then, the variation due to the ambient temperature of a detection output signal corresponding to the temperature of the fixing belt from the detector is corrected based on a compensation output signal corresponding to the ambient temperature from the compensation detector. Specifically, a control circuit for the temperature detection sensor corrects the detection output signal corresponding to the temperature of the fixing belt, based on the compensation output signal corresponding to the ambient temperature from the compensation detector.

Thus, although the temperature detection main sensor 123*a* and the temperature detection sub-sensor 123*b* are exposed outward, the temperature of the fixing belt can be detected accurately.

The detection output signal and the compensation output signal from the temperature detection sensor may be output to the controller 124. Then, the controller 124 may specify the temperature of the fixing belt, based on the detection output signal and the compensation output signal.

The temperature detection main sensor 123*a* and the temperature detection sub-sensor 123*b* are each attached to the holder 140 by snap fitting. Meanwhile, the main thermostat 121*a* and the sub-thermostat 121*b* are each assembled to the holder 140 with a screw. Since the temperature detection sensors 123*a* and 123*b* are each secured by snap fitting, the temperature detection sensors 123*a* and 123*b* can be each attached to the fixing cover with an inexpensive configuration.

Figure 6:
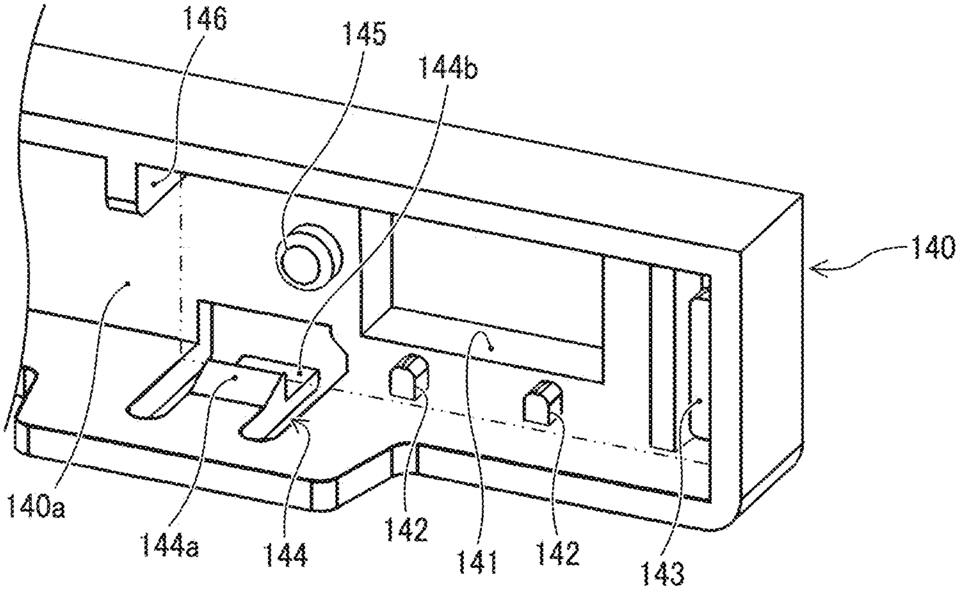
FIG. 6 is a perspective view of the periphery of the part that a holder has for attachment of a temperature detection sub-sensor.

FIG. 6 is a perspective view of the periphery of the part that the holder 140 has for attachment of the temperature detection sub-sensor 123*b*.

As illustrated in FIG. 6, the holder 140 boxy in shape has a bottom 140*a* provided with a through hole 141 that allows the detector 123*b*1 of the temperature detection sub-sensor 123*b* to penetrate therethrough (refer to FIG. 5). The bottom 140*a* of the holder 140 is provided with positioning projections 142 and 145 that position the temperature detection sub-sensor 123*b* in a sensor setting direction in a case where the temperature detection sub-sensor 123*b* has a sensor substrate 123*b*2 butting against the positioning projections 142 and 145 (refer to FIG. 5).

The holder 140 includes a retainer 143 for holding an end in the longitudinal direction of the sensor substrate 123*b*2 of the temperature detection sub-sensor **123*b* (right end in FIG. 6). The holder 140 includes a snap fitter 144 for holding the side of location of the other end in the longitudinal direction of the sensor substrate 123*b*2 (left side in FIG. 6**).

Furthermore, the holder 140 includes a positioning wall 146 that positions the temperature detection sub-sensor **123*b* in the longitudinal direction (in the left-and-right direction in FIG. 6) in a case where the other end in the longitudinal direction of the sensor substrate 123*b*2 of the temperature detection sub-sensor 123*b* faces the positioning wall 146 (left end in FIG. 6**).

Figure 7:
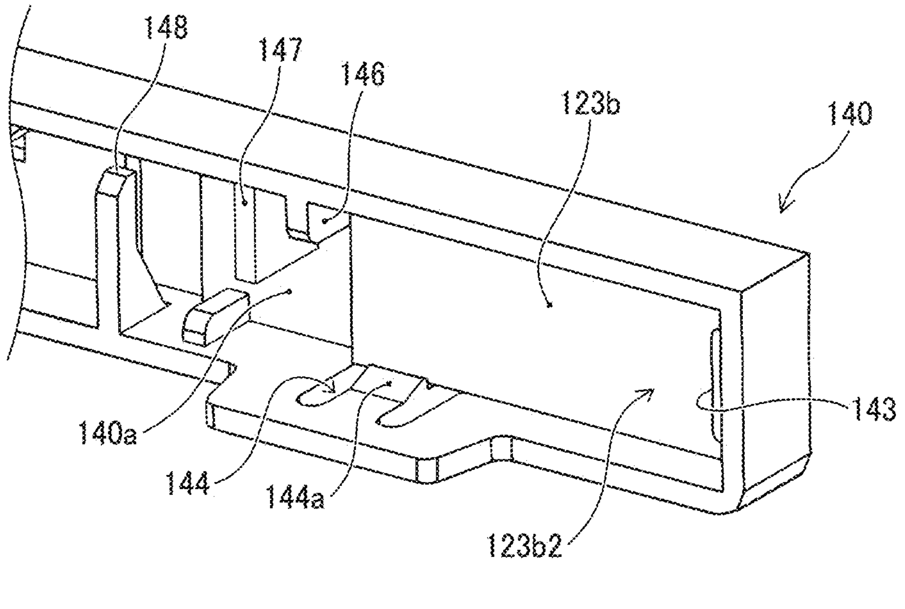
FIG. 7 is a perspective view of the temperature detection sub-sensor attached to the holder.
Figure 8:
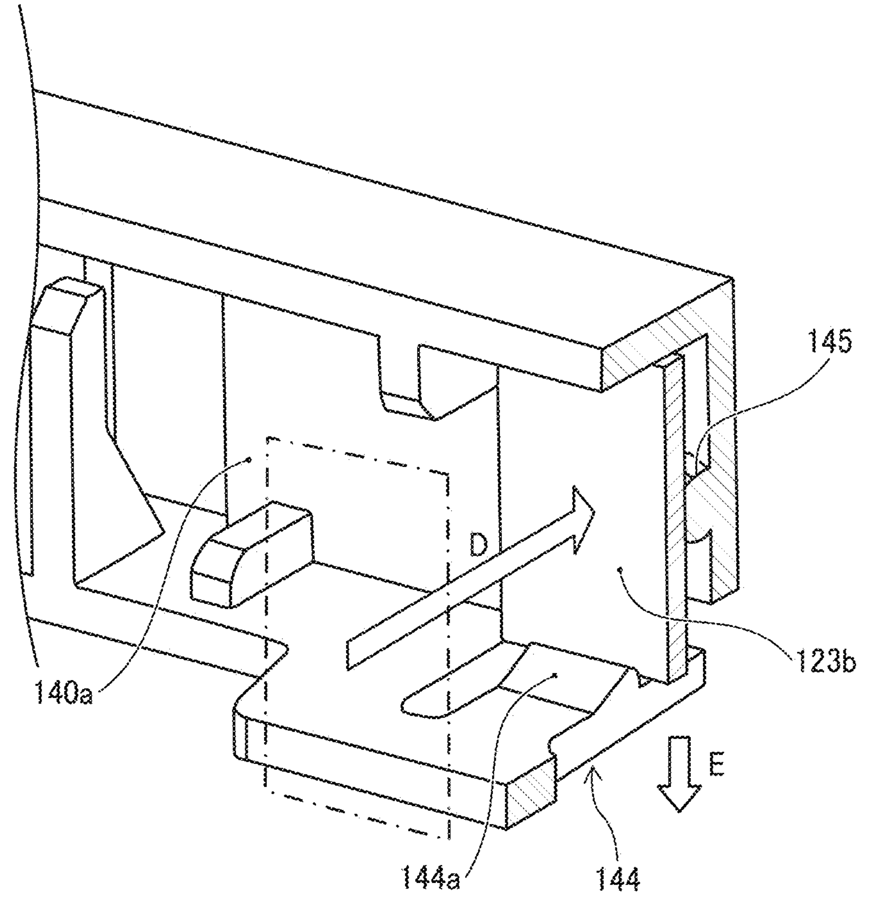
FIG. 8 is a perspective, cross-sectional view of the neighborhood of a snap fitter.

FIG. 7 is a perspective view of the temperature detection sub-sensor **123*b* attached to the holder 140. FIG. 8 is a perspective, cross-sectional view of the neighborhood of the snap fitter 144**.

In order to attach the temperature detection sub-sensor **123*b* to the holder 140, an end in the longitudinal direction of the sensor substrate 123*b*2 of the temperature detection sub-sensor 123*b* (right end in FIG. 7) is inserted between the retainer 143 and the bottom 140*a*. Next, the other end in the longitudinal direction of the sensor substrate 123*b*2 is pushed to the side of location of the bottom 140*a* as indicated with an arrow D in FIG. 8. Then, the snap fitter 144 deforms elastically in the direction of an arrow E in FIG. 8. Thus, the side of location of the other end in the longitudinal direction of the sensor substrate 123*b*2 (left side in FIG. 7) gets over a claw 144*a* of the snap fitter 144, so that the side of location of the other end in the longitudinal direction of the sensor substrate 123*b*2 is held by the snap fitter 144**.

The holder 140 is made of resin material such that the snap fitter 144 can deform elastically with ease. Since the holder is made of resin material, insulation is ensured.

In the present embodiment, a single snap fitter 144 holds the temperature detection sub-sensor **123*b*. Thus, for the following reason, the temperature detection sub-sensor 123*b* can be detached easily from the holder 140, leading to an enhancement in the workability of replacement of the temperature detection sub-sensor 123*b*. That is, in a case where two snap fitters hold the temperature detection sub-sensor 123*b*, the temperature detection sub-sensor 123*b* is detached from the holder 140 with one hand pushing away the two snap fitters and the other hand grasping the temperature detection sub-sensor 123*b*. Because the two snap fitters are difficult to push away with one hand, the temperature detection sub-sensor 123*b* is difficult to detach from the holder 140**.

On the other hand, in a case where a single snap fitter holds the temperature detection sub-sensor **123*b* as in the present embodiment, it is sufficient to push away the single snap fitter with one hand. Therefore, in comparison to a case where two snap fitters hold the temperature detection sub-sensor 123*b*, the temperature detection sub-sensor 123*b* can be detached from the holder 140 with the snap fitter being pushed away easily. Thus, in comparison to a case where two snap fitters hold the temperature detection sub-sensor 123*b*, an enhancement can be made in the workability of replacement of the temperature detection sub-sensor 123*b***.

Note that, similarly to the temperature detection sub-sensor **123*b*, regarding the temperature detection main sensor 123*a*, the side of location of an end in the longitudinal direction of the temperature detection main sensor 123*a* is held by a retainer and the side of location of the other end in the longitudinal direction of the temperature detection main sensor 123*a* is held by a snap fitter. Similarly to the temperature detection sub-sensor 123*b*, regarding the temperature detection main sensor 123*a*, a single snap fitter holds the temperature detection main sensor 123*a*. Thus, an enhancement can be made in the workability of replacement of the temperature detection main sensor 123*a***.

Figure 9A:
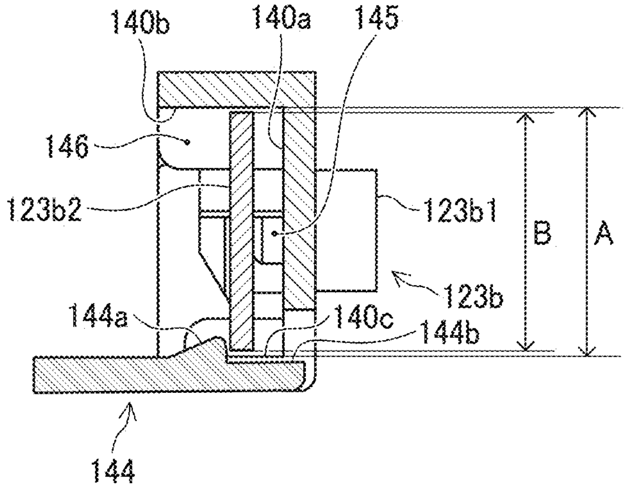
FIGS. 9A and 9B are explanatory views for the dimensional relationship between a sensor substrate of the temperature detection sub-sensor and the holder.
Figure 9B:
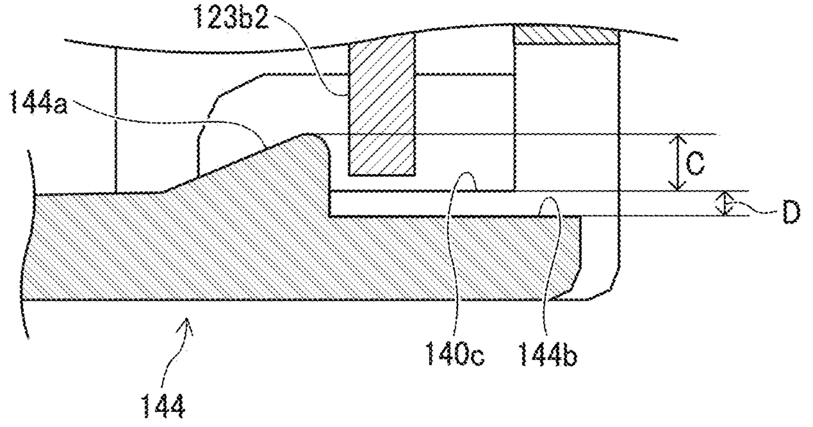

FIGS. 9A and 9B are explanatory views for the dimensional relationship between the sensor substrate **123*b*2 of the temperature detection sub-sensor 123*b* and the holder 140**.

The dimensional relationship between the sensor substrate **123*b*2 of the temperature detection sub-sensor 123*b* and the holder 140 will be described with FIGS. 9A and 9B. Note that the dimensional relationship between the sensor substrate of the temperature detection main sensor 123*a* and the holder 140 is similar to the dimensional relationship between the sensor substrate 123*b*2 of the temperature detection sub-sensor 123*b* and the holder 140**.

As illustrated in FIG. 9A, the length in the lateral direction of the sensor substrate **123*b*2 of the temperature detection sub-sensor 123*b* is defined as B, and the inner length in the lateral direction of the holder 140 (distance between an inner wall face 140*b* and another inner wall face 140*c* along the longitudinal direction of the holder 140) is defined as A. As illustrated in FIG. 9B, the height of the snap fitter 144 (length between the inner wall face 140*c* of the holder and the top of the claw 144*a*) is defined as C. In this case, necessary conditions for the temperature detection sub-sensor 123*b* to be held by the holder 140** are given by the following Expressions 1 and 2.

$$A > B \quad \text{Expression 1}$$

$$B > A - C \quad \text{Expression 2}$$

Fulfillment of the relationship in Expression 1 enables the temperature detection sub-sensor **123*b* to be put into the holder 140 boxy in shape. Fulfillment of the relationship in Expression 2 enables the claw 144*a* of the snap fitter 144 to face the sensor substrate 123*b*2 in the sensor setting direction. Thus, the temperature detection sub-sensor 123*b* (side of location of the other end in the longitudinal direction of the sensor substrate) can be held by the snap fitter 144**.

As illustrated in FIG. 9B, the snap fitter 144 has an opposed face **144*b* that is opposed to the sensor substrate 123*b*2 in the lateral direction of the holder 140 and is farther away by D mm from the sensor substrate 123*b*2 than the inner wall face 140*c* of the holder 140** is.

A longer dimension C enables fulfillment of the relationship in Expression 2 even with a variation in the dimension B in the lateral direction of the sensor substrate **123*b*2 due to a manufacturing error. Thus, the temperature detection sub-sensor 123*b* can be held by the snap fitter 144. However, a longer dimension C causes an increase in the amount of elastic deformation of the snap fitter 144 in the direction of the arrow E of FIG. 8 in assembling a temperature detection sensor having its dimension B longer than the criterion. As a result, the base of the snap fitter 144 is likely to be broken. In order to detach the temperature detection sensor from the holder 140, the snap fitter 144** requires highly pushing away. Thus, a deterioration is likely to occur in the workability of replacement.

A shorter dimension C enables a reduction in the amount of elastic deformation of the snap fitter 144 in assembling a temperature detection sensor having its dimension B longer than the criterion. Thus, the snap fitter 144 can be inhibited from being damaged. Because the snap fitter 144 requires no highly pushing away, the temperature detection sensor can be easily detached from the holder 140. Thus, an enhancement can be made in the workability of replacement of the temperature detection sensor. However, a shorter dimension C does not enable fulfillment of the relationship in Expression 2 in a case where the length B in the lateral direction of the sensor substrate **123*b*2** is shorter than the criterion.

In a case where the length B in the lateral direction of the sensor substrate **123*b*2 is shorter than the criterion and the following relationship is fulfilled: B<A−C, due to backlash in the lateral direction of the temperature detection sensor in the holder 140, the sensor substrate 123*b*2 is likely to fail to face the claw 144*a* of the snap fitter 144. If the sensor substrate 123*b*2 fails to face the claw 144*a* of the snap fitter 144, the temperature detection sensor is likely to come off the holder 140**.

In particular, in the present embodiment, as illustrated in FIG. 5, as a structure, the bottom **140*a* of the holder 140 is located above the sensor substrate 123*b*2 and the temperature detection sensor is supported by the retainer 143 and the claw 144*a* of the snap fitter 144. Thus, if the claw 144*a* fails to face the sensor substrate 123*b*2 because of no fulfillment of the relationship in Expression 2, due to the self-weight of the temperature detection sensor, the temperature detection sensor is highly likely to come off the holder 140. As illustrated in FIG. 5, in a case where the angle θ between the sensor substrate 123*b*2 and the horizontal plane is 60° or less and in a case where the relationship in Expression 2 is not fulfilled, due to the self-weight of the temperature detection sensor, the temperature detection sensor is highly likely to come off the holder 140**.

Thus, in the present embodiment, provided is a harness regulator as a regulator that pushes a harness extending from the temperature detection sensor to the side of location of the snap fitter to regulate the harness, in which the temperature detection sensor is pushed to the side of location of the snap fitter through the harness. Thus, even in a case where the relationship in Expression 2 is not fulfilled, the sensor substrate **123*b*2 can be inhibited from not facing the claw 144*a*. Thus, the temperature detection sensor can be inhibited from coming off the holder 140**. Features in the present embodiment will be specifically described below with some drawings.

Figure 10:
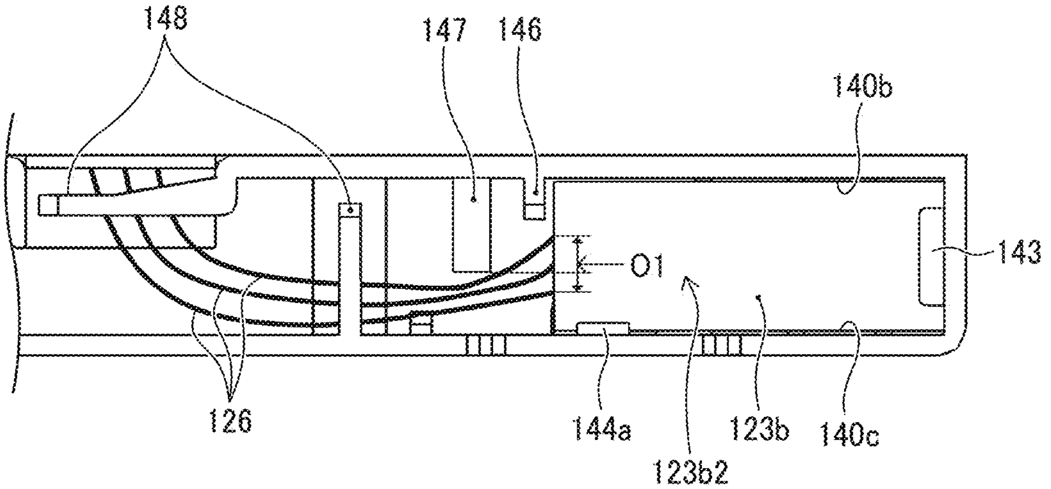
FIG. 10 is an explanatory view for laying of a harness extending from the temperature detection sub-sensor.

FIG. 10 is an explanatory view for laying of a harness 126 extending from the temperature detection sub-sensor **123*b***.

The temperature detection sub-sensor **123*b* will be given in the following description. Note that laying of a harness 126 extending from the temperature detection main sensor 123*a* is similar to laying of a harness 126 extending from the temperature detection sub-sensor 123*b***.

As illustrated in FIG. 10, three harnesses 126 extend from the other end in the longitudinal direction of the sensor substrate **123*b*2 of the temperature detection sub-sensor 123*b* (left end in FIG. 10). Provided is a harness regulator 147 as a regulator that is wall-shaped and extends from the inner wall face 140*b* (upper inner wall face in FIG. 10) on the opposite side to the side of location of the snap fitter 144 of the holder 140 toward the inner wall face 140*c* (lower inner wall face in FIG. 10) on the side of location of the snap fitter. The harness regulator 147 is provided near the positioning wall 146 that positions the temperature detection sub-sensor 123*b* in the longitudinal direction (in the left-and-right direction in FIG. 10**).

The leading end of the harness regulator 147 that regulates, in abutment with a harness, movement of the harness to the opposite side to the side of location of the snap fitter is located at the following position in the up-and-down direction in FIG. 10 (in a direction orthogonal to the direction in which the harness extends from the sensor substrate, namely, in the lateral direction of the sensor substrate and the holder). That is, the leading end of the harness regulator 147 is located closer to the snap fitter 144 than a position O1 is. The position O1 is located at half of the distance between the connection point between the sensor substrate **123*b*2 and the uppermost harness (harness extending, farthest away from the snap fitter, from the sensor substrate) from among the plurality of harnesses in FIG. 10 and the connection point between the sensor substrate 123*b*2 and the lowermost harness (harness extending, closest to the snap fitter, from the sensor substrate) from among the plurality of harnesses in FIG. 10**.

The holder 140 includes two second harness regulators 148 each as a second regulator that regulates the harnesses 126 in the opposite direction to the direction in which the temperature detection sub-sensor **123*b* is set to the holder 140**.

As illustrated in FIG. 10, the harness regulator 147 brings, to the side of location of the snap fitter, the part that at least the uppermost harness in FIG. 10, among the three harnesses 126 extending from the sensor substrate **123*b*2, has at a predetermined distance from the connection point with the sensor. Thus, the uppermost harness 126 in FIG. 10 extending, farthest way from the snap fitter 144, from the sensor substrate 123*b*2 is bent to the side of location of the snap fitter by the harness regulator 147. Thus, movement of the harness to the opposite side to the side of location of the snap fitter due to the elasticity of the harness is regulated by the harness regulator 147. As a result, the regulation force of the harness regulator 147 that regulates movement of the harness 126 to the opposite side to the side of location of the snap fitter is transmitted to the temperature detection sub-sensor 123*b* through the harness. Thus, the side of location of the other end in the longitudinal direction of the temperature detection sub-sensor 123*b* (namely, in the axial direction of the pressure roller) (left end in FIG. 10) is pushed to the side of location of the snap fitter. As a result, as indicated with a dashed line in FIG. 11, the temperature detection sub-sensor 123*b* slants such that the side of location of the other end in the longitudinal direction of the temperature detection sub-sensor 123*b* comes close to the side of location of the snap fitter. Thus, even in a case where the dimension B in the lateral direction of the sensor substrate 123*b*2 of the temperature detection sub-sensor 123*b* is shorter than the criterion and the following relationship is fulfilled: B<A−C, the claw 144*a* can face the sensor substrate 123*b*2. Therefore, the temperature detection sub-sensor 123*b* can be favorably inhibited from coming off the holder 140**.

The harness regulator 147 regulates the harness simply such that the harness 126 comes close to the side of location of the snap fitter 144. Thus, the harness can be easily detached from the harness regulator 147. After the harness 126 regulated by the harness regulator 147 is released, thrusting the snap fitter 144 enables detachment of the temperature detection sub-sensor **123*b* from the holder 140. As above, without thrusting the snap fitter 144 and releasing the regulation of the harness regulator 147 at the same time, the temperature detection sub-sensor 123*b* can be detached from the holder 140**. Therefore, in comparison to a configuration in which a temperature detection sensor is detached from a holder with two snap fitters being thrusted simultaneously, the temperature detection sensor can be easily replaced, leading to an enhancement in the workability of replacement of the temperature detection sensor.

The regulation force of the harness regulator 147 enables inhibition of the side of location of the other end in the longitudinal direction of the temperature detection sub-sensor 123*b* from having backlash in the lateral direction of the holder 140. Therefore, the side of location of the other end in the longitudinal direction of the sensor substrate 123*b*2 can be inhibited from moving upward in FIG. 11 such that the claw 144*a* and the sensor substrate 123*b*2 do not face mutually. As a result, the temperature detection sub-sensor 123*b* can be favorably inhibited from coming off the holder 140.

Even in a case where the dimension B in the lateral direction of the sensor substrate 123*b*2 of the temperature detection sub-sensor 123*b* is shorter than the criterion due to variations in the dimensions of the sensor substrate, the height C of the claw 144*a* requires no setting for fulfillment of the relationship in Expression 2. Therefore, in a case where the dimension B in the lateral direction of the sensor substrate is identical to the criterion, the height C of the claw 144*a* can be set such that the relationship in Expression 2 is fulfilled minimally. Thus, the height C of the claw 144*a* is shorter than the height C of the claw 144*a* set such that the relationship in Expression 2 is fulfilled in a case where the dimension B in the lateral direction of the sensor substrate 123*b*2 of the temperature detection sub-sensor 123*b* is shorter than the criterion due to variations in the dimensions of the sensor substrate. As a result, a reduction can be made in the amount of elastic deformation of the snap fitter 144 in assembling the temperature detection sensor. Thus, the snap fitter 144 can be inhibited from being damaged and additionally an enhancement can be made in the workability of replacement of the temperature detection sensor.

As illustrated in FIG. 9B, the opposed face 144*b* of the snap fitter 144 that is opposed to the sensor substrate 123*b*2 in the lateral direction of the holder 140 (in a direction orthogonal to the direction in which a harness extends from the sensor substrate) is farther away by D mm from the sensor substrate 123*b*2 than the inner wall face 140*c* of the holder 140 is. Thus, in comparison to a case where the distance in the lateral direction between the opposed face 144*b* and the sensor substrate 123*b*2 is identical to the distance in the lateral direction between the inner wall face 140*c* of the holder 140 and the sensor substrate 123*b*2, the following advantage can be obtained. That is, the side of location of the other end in the longitudinal direction of the temperature detection sub-sensor 123*b* (side from which a harness extends) can be brought closer to the side of location of the snap fitter by the regulation force of the harness regulator 147. As a result, the side of location of the other end in the longitudinal direction of the temperature detection sub-sensor 123*b* can be more firmly caught by the claw 144*a*, so that the temperature detection sub-sensor 123*b* can be favorably inhibited from coming off the holder 140 as an advantage.

Note that, in the present embodiment above, the opposed face 144*b* is farther away by 1 (D=1) mm from the sensor substrate 123*b*2 than the inner wall face 140*c* of the holder is.

In the present embodiment, as illustrated in FIG. 10, the two second harness regulators 148 regulate the harnesses 126 in the opposite direction to the direction in which the temperature detection sub-sensor 123*b* is set to the holder 140. Thus, the following effect can be obtained. That is, for example, in assembling to the device, such as connection of a connector provided at the leading end of a harness 126 to the controller, the leading end of the harness 126 may be pulled in the opposite direction to the direction in which the temperature detection sub-sensor 123*b* is set. In this case, the second harness regulators 148 each function as a stopper, so that force in the opposite direction to the sensor setting direction can be inhibited from being applied to the temperature detection sub-sensor 123*b* through the harness 126. Thus, in assembling, the temperature detection sub-sensor 123*b* can be inhibited from coming off the holder 140.

Next, harness regulators according to modifications will be described.

Modification 1

Figure 12:
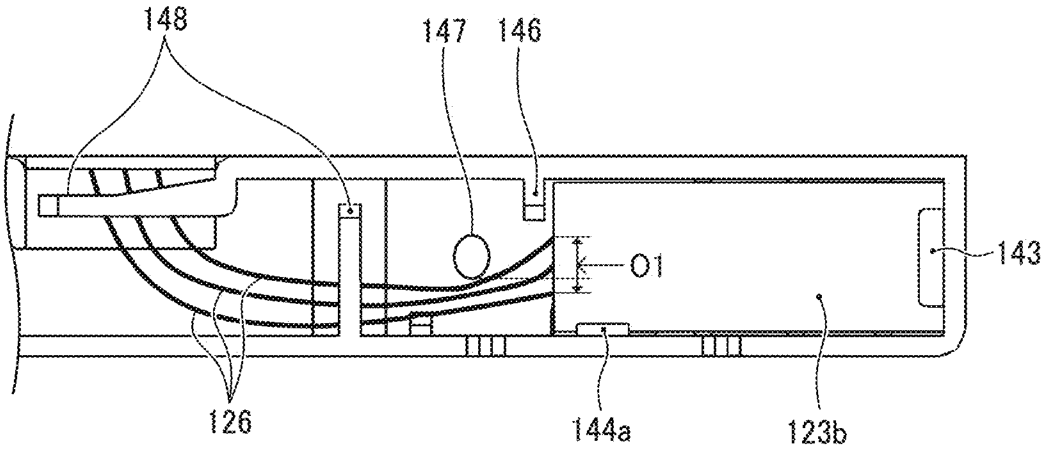
FIG. 12 is an explanatory view of a harness regulator according to a first modification.

FIG. 12 illustrates a harness regulator 147 according to Modification 1.

Note that FIG. 12 illustrates regulation of a harness extending from a temperature detection sub-sensor 123*b*. Modification 1 in the following description can be also adopted for a temperature detection main sensor 123*a*.

As illustrated in FIG. 12, the harness regulator 147 according to Modification 1 is boss-shaped. In Modification 1, the harness regulator 147 regulates movement of a harness in the opposite direction to the side of location of a snap fitter, with its part, closest to the snap fitter in the lateral direction of a holder (in a direction orthogonal to the direction in which the harness extends from a sensor), in abutment with the harness.

Then, in Modification 1, the part closest to the snap fitter of the harness regulator 147, on which the harness abuts, is located at the following position in the lateral direction of the holder. That is, the part closest to the snap fitter of the harness regulator 147 is located closer to the snap fitter 144 than a position O1 is. The position O1 is located at half of the distance between the connection point between a sensor substrate 123*b*2 and the harness extending from the sensor substrate farthest away from the snap fitter from among a plurality of harnesses and the connection point between the sensor substrate 123*b*2 and the harness extending from the sensor substrate closest to the snap fitter from among the plurality of harnesses.

Therefore, according to such a configuration in Modification 1, at least part near the sensor substrate of the harness extending from the sensor substrate farthest away from the snap fitter from among the plurality of harnesses can be bent to the side of location of the snap fitter by regulation of the harness regulator 147. As a result, due to the regulation force of the harness regulator 147 that regulates movement of the harness in the opposite side (upper side in FIG. 12) to the side of location of the snap fitter due to the elasticity of the harness, the temperature detection sub-sensor 123*b* slants such that the side of the other end in the longitudinal direction of the temperature detection sub-sensor 123*b* comes close to the side of location of the snap fitter. Therefore, even in a case where the dimension B in the lateral direction of the sensor substrate 123*b*2 is shorter than the criterion due to variations in the dimensions of the sensor substrate 123*b*2 and the relationship in Expression 2 is not fulfilled, the side of location of the other end of the temperature detection sub-sensor 123*b* can be favorably held by the snap fitter 144. Thus, the temperature detection sub-sensor 123*b* can be favorably inhibited from coming off the holder 140. In a case where the dimension B in the lateral direction of the sensor substrate is identical to the criterion, the height C of a claw 144*a* can be set such that the relationship in Expression 2 is fulfilled minimally. Thus, the snap fitter 144 can be inhibited from being damaged and additionally an enhancement can be made in the workability of replacement of the temperature detection sensor.

Since the harness regulator 147 is boss-shaped, in comparison to the configuration illustrated in FIG. 10 in which the harness regulator 147 is wall-shaped, a reduction can be made in the amount of resin material of the holder 140, leading to a reduction in the cost of the device.

Note that the harness regulator 147 wall-shaped illustrated in FIG. 10 enables obtainment of the following advantage, in comparison to the modification in which the harness regulator 147 is boss-shaped. That is, in the modification illustrated in FIG. 12, a harness 126 is likely to be laid wrong on the opposite side to the side of location of the snap fitter of the harness regulator 147. On the other hand, the harness regulator 147 wall-shaped illustrated in FIG. 10 does not allow, as an advantage, such wrong laying of a harness as based on the configuration in the modification.

Modification 2

Figure 13:
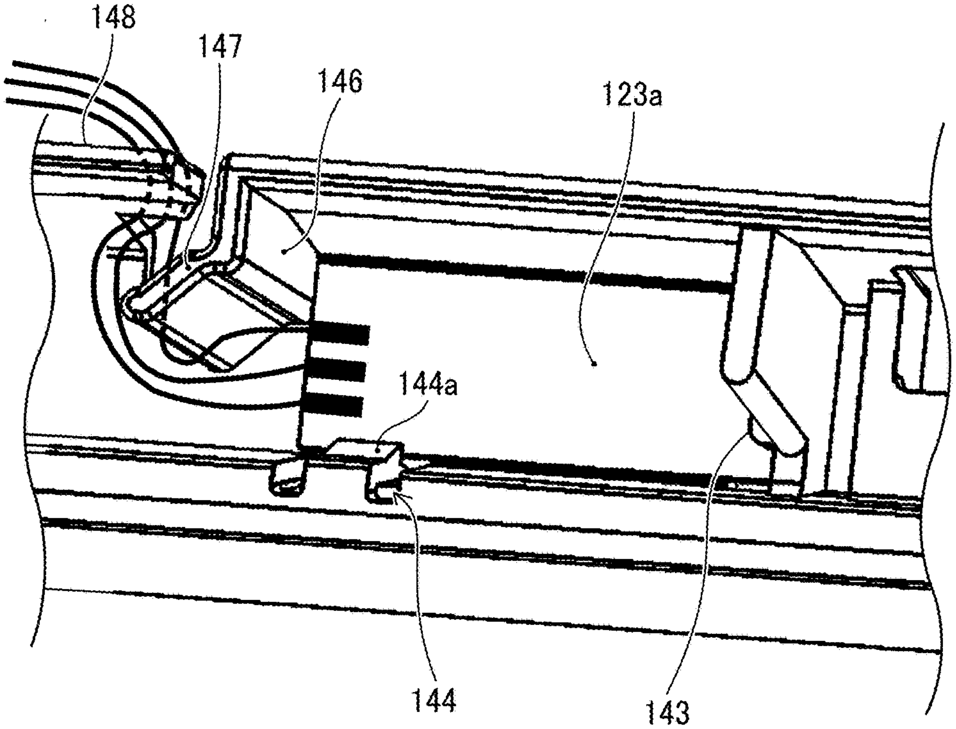
FIG. 13 is a perspective view of a harness regulator according to a second modification.
Figure 14:
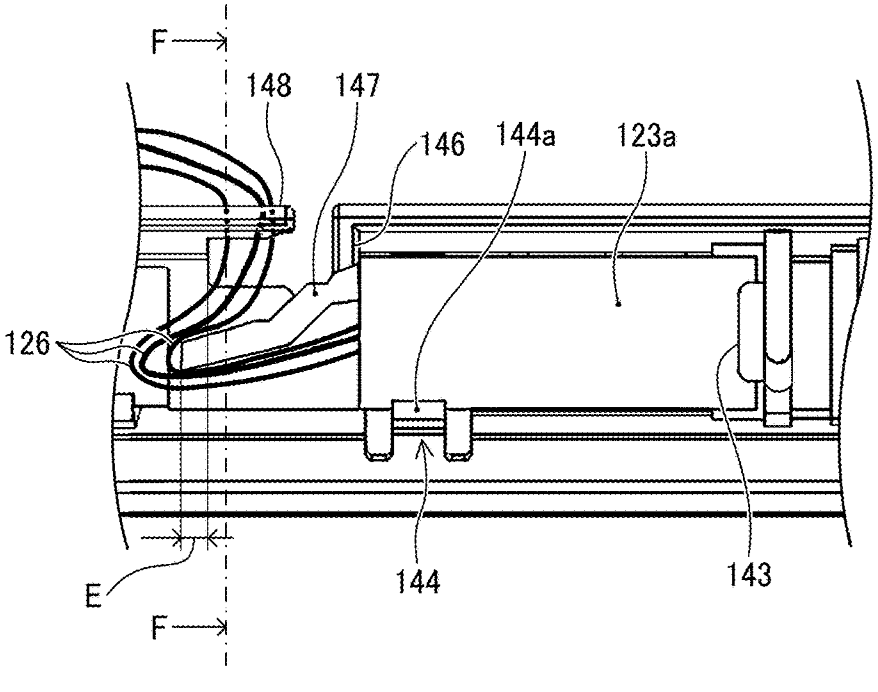
FIG. 14 is a front view of a holder in the second modification.
Figure 15:
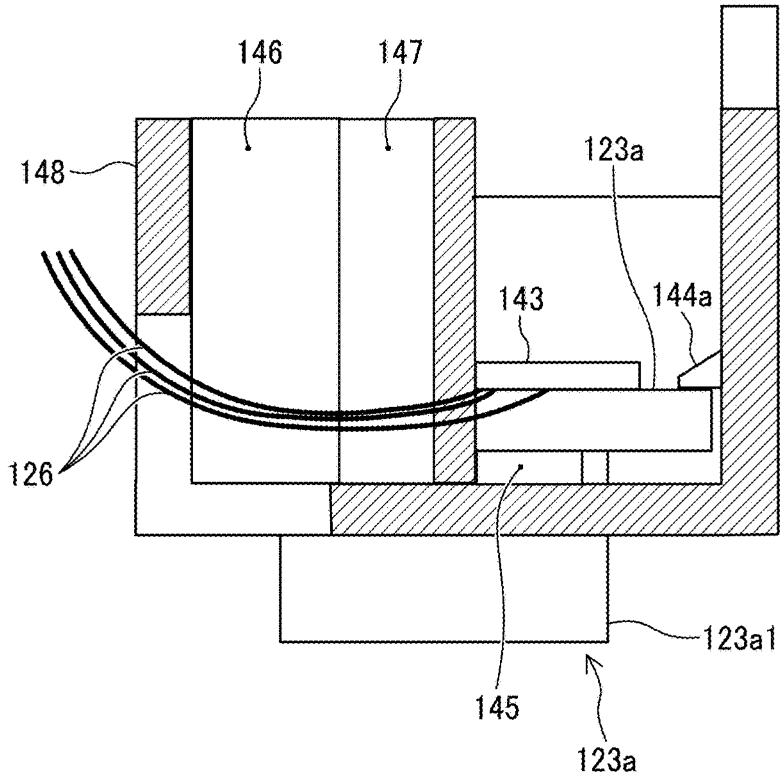
FIG. 15 is a cross-sectional view taken along line F-F of FIG. 14.

FIG. 13 is a perspective view of a harness regulator 147 according to Modification 2. FIG. 14 is a front view of a holder 140 in Modification 2. FIG. 15 is a cross-sectional view taken along line F-F of FIG. 14. Note that FIGS. 13 to 15 illustrate regulation of a harness extending from a temperature detection main sensor 123*a*. Modification 2 in the following description can be also adopted for a temperature detection sub-sensor 123*b*.

The harness regulator 147 according to Modification 2 extends from the leading end of a positioning wall 146 that positions the temperature detection main sensor 123*a* in the longitudinal direction (in the left-and-right direction in FIG. 13). Specifically, the harness regulator 147 according to Modification 2 extends at a slant from the leading end of the positioning wall 146 such that the leading end of the harness regulator 147 is farther away from the temperature detection main sensor 123*a* in the longitudinal direction of the holder (in the left-and-right direction in FIG. 13). Then, the harness regulator 147 partially overlaps a second harness regulator 148 that regulates a harness 126 from the temperature detection main sensor 123*a* in the opposite direction to the direction in which the temperature detection main sensor 123*a* is set to the holder 140 (overlaps the second harness regulator 148 in the lateral direction of the holder).

Furthermore, the harness regulator 147 according to Modification 2 has its leading end that is farther away by E mm from the temperature detection main sensor 123*a* than the second harness regulator 148 is (refer to FIG. 14).

According to such a configuration, as illustrated in FIGS. 13 and 14, each harness 126 extending from the temperature detection main sensor 123*a* is laid around the second harness regulator 148 while wrapping around the harness regulator 147 in the longitudinal direction of the holder 140. Thus, for example, even in a case where the side of location of the leading end of a harness 126 is pulled in assembling to a device, such as connection of a connector provided at the leading end of the harness 126 to a controller, the laying of the harness 126 near the temperature detection main sensor 123*a* can be inhibited from being changed. Thus, the harness regulator 147 can regulate the harness 126 reliably, so that the regulation of the harness regulator 147 can be favorably inhibited from being released.

Figure 11:
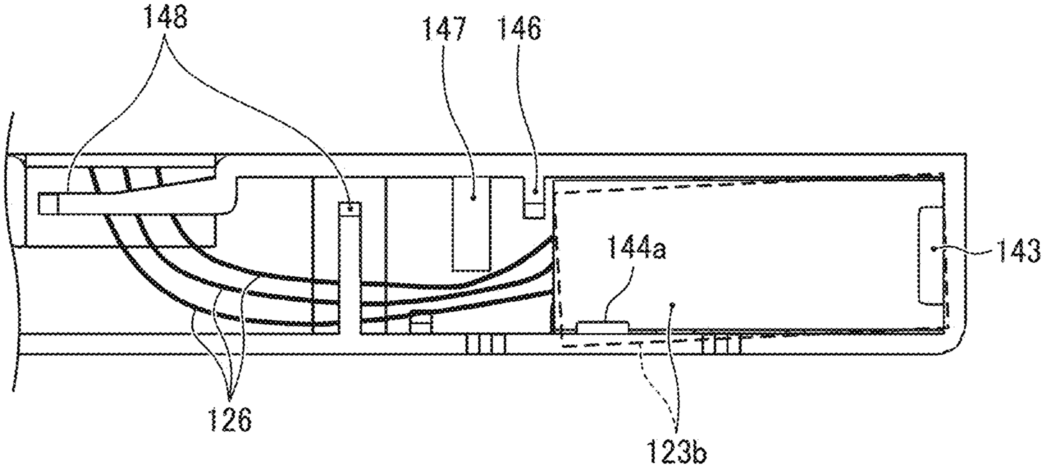
FIG. 11 is an explanatory view for the slant of the temperature detection sub-sensor due to the regulation force of a harness regulator.

For regulation of a harness extending from the temperature detection main sensor 123*a* or regulation of a harness extending from the temperature detection sub-sensor 123*b*, any of the shape illustrated in FIGS. 10 and 11, Modification 1 illustrated in FIG. 12, and Modification 2 illustrated in FIGS. 13 to 15 may be appropriately adopted. However, for regulation of a harness extending from the temperature detection main sensor 123*a* and regulation of a harness extending from the temperature detection sub-sensor 123*b*, preferably, Modification 2 illustrated in FIGS. 13 to 15 is adopted. This is because adoption of Modification 2 illustrated in FIGS. 13 to 15 for both of the main sensor and the sub-sensor enables a reduction in the size of the device in the longitudinal direction of the holder, in comparison to a case where the configuration illustrated in FIGS. 10 and 11 is adopted for at least either the main sensor or the sub-sensor.

Next, a fixing device according to a modification will be described.

Figure 16:
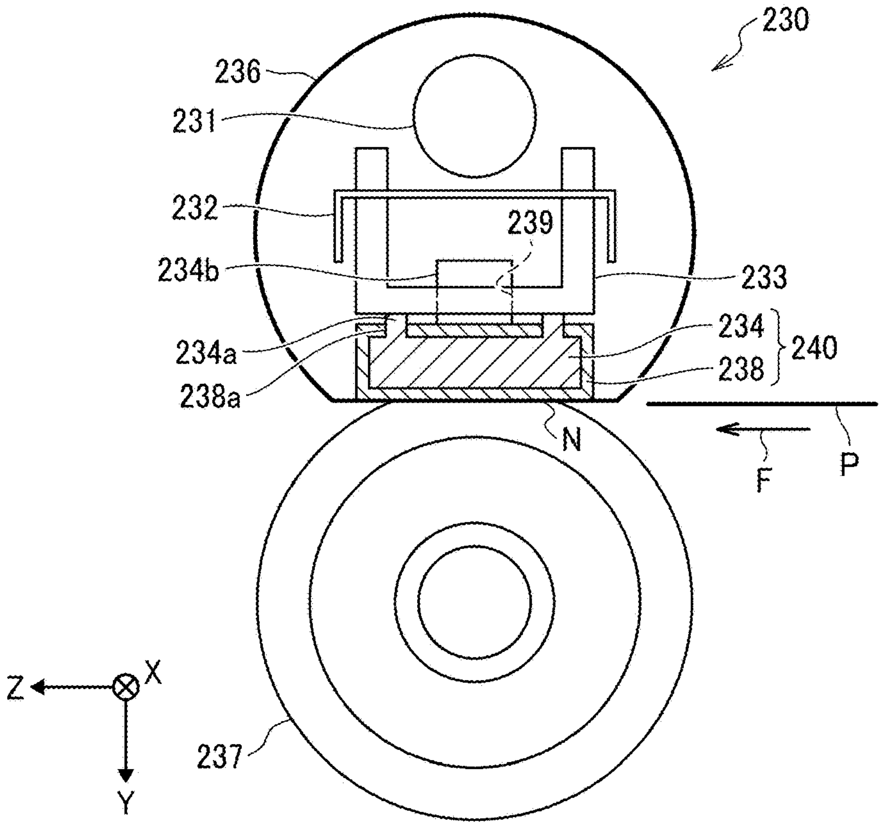
FIG. 16 is a cross-sectional view of a fixing device according to a modification.
Figure 17:
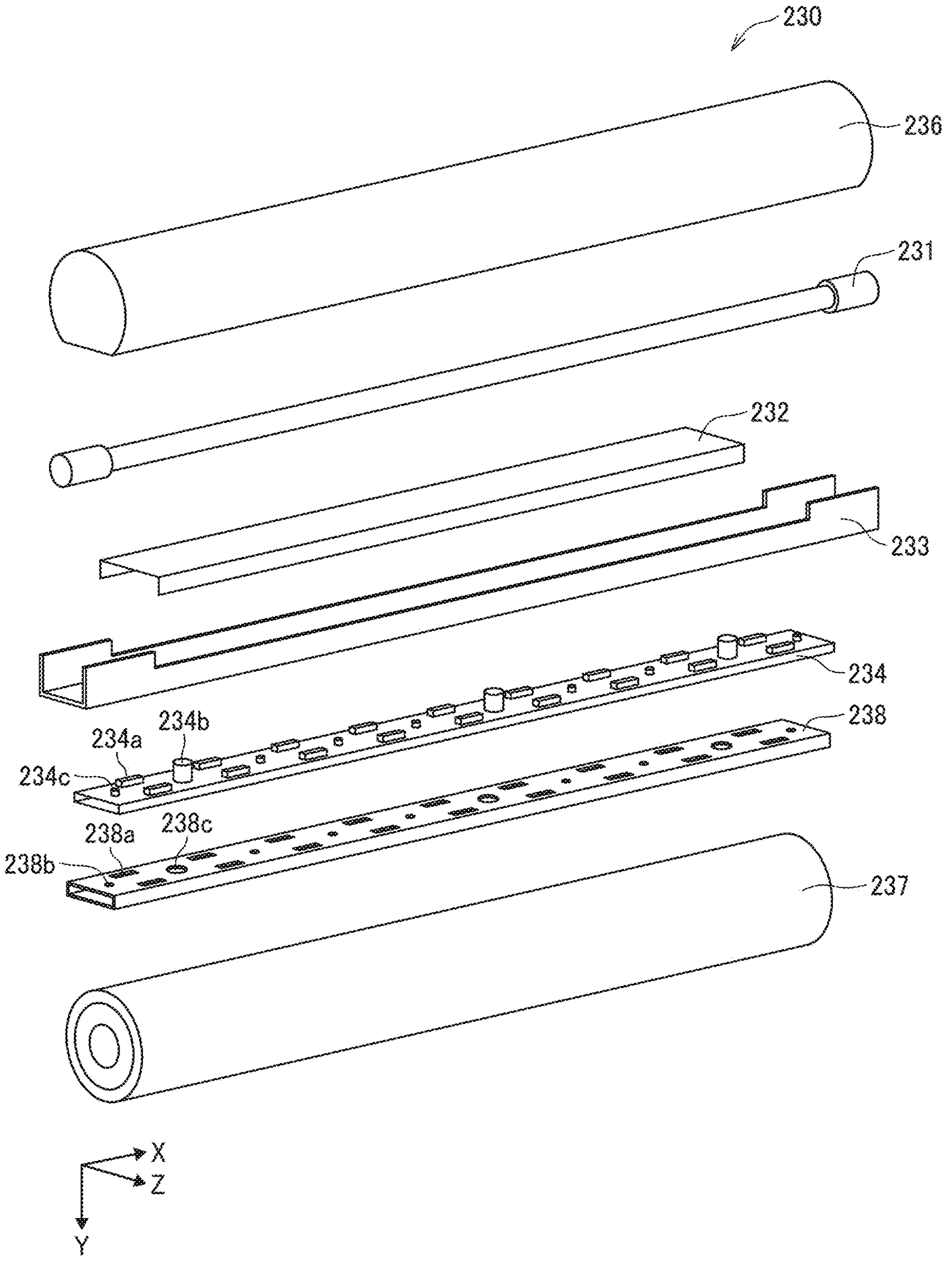
FIG. 17 is a perspective exploded view of the fixing device according to the modification.

FIG. 16 is a cross-sectional view of a fixing device 230 according to a modification. FIG. 17 is an exploded perspective view of the fixing device 230 according to the modification.

The fixing device 230 according to the modification includes a heater 231, a reflector 232, a stay 233, a fixing belt 236, a pressure roller 237, and a nip formation member 240. The nip formation member 240 includes a pad 234 and a sliding sheet 238.

The fixing belt 236 is an endless belt having a predetermined inner diameter and a width wider than the width of a sheet P. The fixing belt 236 is formed of material having flexibility and includes, for example, a base layer, an elastic layer provided on the outer circumferential face of the base layer, and a release layer provided on the outer circumferential face of the elastic layer.

The base layer is formed of a metal, such as SUS or Ni. For example, the elastic layer is formed of silicone rubber. For example, the release layer is formed of a PFA tube. The fixing belt 236 has its both ends supported rotatably by a fixing housing.

The fixing belt 236 has a hollow of which the lower side is provided with the stay 233. The stay 233 is a channel-shaped member that has an opening at its upper face (has a U-shaped cross section) and is longer than the length in the width direction X of the fixing belt 236. The stay 233 has its both ends supported by the fixing housing. The stay 233 has three positioning holes 239 at predetermined intervals in the width direction X. Positioning pins 234*b* of the pad 234 of the nip formation member 240 are fitted into the positioning holes 239, so that the nip formation member 240 is positioned to the stay 233. The stay 233 has its upper face on which the reflector 232 is supported.

The heater 231 (e.g., a halogen heater) has a length equivalent to the length along the axis of rotation of the fixing belt 236. The heater 231 is disposed on the upper side of the hollow of the fixing belt 236 (above the stay 233) and has its both ends supported by the fixing housing.

The heater 231 emits radiant heat to the inner circumferential face of the fixing belt 236 (mainly, a part slightly smaller than the upper half of the inner circumferential face) to heat the fixing belt 236. The radiant heat emitted downward from the heater 231 is reflected to the inner circumferential face of the fixing belt 236 by the reflector 232. The heater 231 is controlled by a controller.

The pressure roller 237 includes a cored bar, an elastic layer provided on the outer circumferential face of the cored bar, and a release layer provided on the outer circumferential face of the elastic layer. For example, the elastic layer is formed of silicone rubber. For example, the release layer is formed of a PFA tube.

The pressure roller 237 is disposed facing the fixing belt 236 and is supported by the fixing housing. With the pressure roller 237 in contact with the outer circumferential face of the fixing belt 236, a nip N is formed between the pressure roller 237 and the fixing belt 236. For example, the pressure roller 237 is driven rotationally by a motor that the controller controls. When the pressure roller 237 rotates counterclockwise in FIG. 16, in accordance with the pressure roller 237, the fixing belt 236 rotates clockwise, namely, counter to the rotation of the pressure roller 237. As a result, the sheet P passes through the nip N.

The pad 234 of the nip formation member 240 is a member that is elongated and flat in the width direction X of the fixing belt 236 and is substantially a rectangular parallelepiped. For example, the pad 234 is formed of a metal material or resin material. As the resin material of the pad 234, super engineering plastics, such as polyphenylene sulfide (PPS), a liquid crystal polymer (LCP), or a polyamide-imide (PAI), can be used. The pad 234 has a face that is opposed to the stay 233 and is provided with a plurality of projections 234*a* (18 projections 234*a*), a plurality of securing pins 234*c* (seven securing pins 234*c*), and a plurality of positioning pins 234*b* (three positioning pins 234*b*) at predetermined positions.

The sliding sheet 238 is a sheet-shaped member that is identical in width to the pad 234 and has a length so as to be windable by one turn around the pad 234. For example, the sliding sheet 238 is formed of PTFE fiber and PPS fiber woven together.

The sliding sheet 238 is wound by one turn around the pad 234 such that both ends of the sliding sheet 238 are located at the center in the direction of sheet conveyance of the face opposed to the stay 233 of the pad 234. The part wound around the face opposed to the stay 233 of the sliding sheet 238 is provided with through holes 238*a* through which the projections 234*a* of the pad 234 penetrate. The sliding sheet 238 having its both ends combined together is provided with securing holes 238*b* that the securing pins 234*c* fit and positioning holes 238*c* that the positioning pins 234*b* fit.

The sliding sheet 238 may be impregnated with lubricant (oil or grease). Then, with the sliding sheet 238, the inner circumferential face of the fixing belt 236 may be coated with the lubricant.

The fixing device 230 according to the modification with such a configuration operates, similarly to the fixing device 32 according to the present embodiment illustrated in FIG. 2, to fix a toner image to the sheet P.

Some embodiments of the present disclosure have been described above. However, embodiments of the present disclosure are not limited to the above specific embodiments. Unless otherwise particularly limited in the above description, various modifications and alterations can be made in the scope of the gist of the present disclosure in the scope of the clams.

For example, any of the embodiments of the present disclosure can be applied to a sensor holder that holds a toner concentration sensor, such as a magnetic sensor, that detects the toner concentration of a two-component developing unit or a sensor holder that holds an adhesion-amount detection sensor, such as an optical sensor, that detects the toner adhesion amount of a toner image on an image bearer, such as a photoconductor or an intermediate transfer belt.

The above description is exemplary, and the following aspects each have a unique effect.

Aspect 1

According to Aspect 1, a sensor holder, such as a holder 140, includes: a single snap fitter 144 that holds a sensor, such as a temperature detection sensor 123*a* or 123*b*; and a regulator, such as a harness regulator 147, that regulates a harness 126 extending from the sensor by a regulation force such that the sensor is pushed to the snap fitter 144 by the regulation force.

In a case where, as a configuration, a sensor has an end and the other end, in a direction orthogonal to the direction in which a harness extends from the sensor, held by respective snap fitters, at the time of replacement of the sensor, the two snap fitters require simultaneous thrusting in the direction orthogonal to the direction in which the harness extends, in order to detach the sensor from a sensor holder. Thus, the work of replacement of the sensor is difficult.

On the other hand, according to Aspect 1, since the sensor is held by the single snap fitter, thrusting the single snap fitter enables detachment of the sensor from the sensor holder. Thus, an enhancement can be made in the workability of replacement of the sensor, in comparison to the above-described configuration.

In comparison to such a configuration in which two snap fitters hold a sensor, such a configuration in which a single snap fitter holds a sensor is likely to cause the sensor to have backlash in a direction away from the snap fitter, leading to a state where the sensor and a claw of the snap fitter do not face. Thus, as a disadvantage, the sensor tends to come off the sensor holder.

However, according to Aspect 1, since the sensor is pushed to the snap fitter by the regulation force of the regulator that regulates the harness, the sensor can be inhibited from having backlash in a direction away from the snap fitter. Thus, the sensor can firmly engage with a claw of the snap fitter, so that the sensor can be favorably inhibited from coming off the sensor holder.

In order to push the sensor to the snap fitter with the regulation force of the regulator that regulates the harness, in abutment with a part that the harness has away from the sensor, the regulator regulates movement of the harness, due to the elasticity of the harness, in the opposite direction to the side of location of the snap fitter in the direction orthogonal to the direction in which the harness extends from the sensor. As above, the regulator does not need to restrict the harness from moving in any direction. Thus, the harness can be easily detached from the regulator. After the harness regulated by the regulator is released, thrusting the single snap fitter enables detachment of the sensor from the sensor holder. As above, without thrusting the snap fitter and releasing the regulation of the regulator at the same time, the sensor can be detached from the sensor holder. Therefore, in comparison to the configuration in which the two snap fitters require simultaneous thrusting for detachment of the sensor from the sensor holder, the sensor can be easily replaced.

Aspect 2

According to Aspect 2, in the sensor holder of Aspect 1, the snap fitter 144 holds an end of the sensor, such as the temperature detection sensor 123*a* or 123*b*, in a direction (lateral direction of the holder and a sensor substrate) orthogonal to a direction in which the harness 126 extends from the sensor (longitudinal direction of the holder and the sensor substrate), and the regulator, such as the harness regulator 147, abuts, from an opposite side to a side of location of the snap fitter in the direction orthogonal to the direction in which the harness extends from the sensor, on a part the harness where the harness has at a predetermined distance from a connection point between the harness and the sensor and regulates movement of the harness to the opposite side to the side of location of the snap fitter due to elasticity of the harness in the direction orthogonal to the direction in which the harness extends from the sensor.

Thus, as described in the embodiment, the regulation force of the regulator, such as the harness regulator 147, that regulates the harness can be applied to the sensor through the harness. Thus, the sensor can be pushed to the snap fitter 144 by the regulation force.

Aspect 3

According to Aspect 3, in the sensor holder of Aspect 2, the harness 126 extending from the sensor, such as the temperature detection sensor 123*a* or 123*b*, includes a plurality of harnesses 126 extending at predetermined intervals in the direction orthogonal to the direction in which the harness 126 extends from the sensor, and, in the direction orthogonal to the direction in which the harness 126 extends from the sensor, the abutment between the regulator, such as the harness regulator 147, and the harness 126 (end on the side of location of the snap fitter of the harness regulator 147) is located closer to the snap fitter than a position is, the position being located at a center between; a connection point between the sensor and a harness coupled to the sensor closest to the snap fitter from among the plurality of harnesses 126; and a connection point between the sensor and a harness coupled to the sensor farthest away from the snap fitter from among the plurality of harnesses.

Thus, as described in the embodiment, the regulator, such as the harness regulator 147, can bend, to the side of location of the snap fitter, at least part near the sensor of the harness coupled to the sensor farthest away from the snap fitter. Thus, the reaction force to the restoring force of the harness 126 serves as the regulation force, so that the sensor can be pushed to the side of location of the snap fitter.

Aspect 4

According to Aspect 4, in the sensor holder of any of Aspects 1 to 3, the regulator, such as the harness regulator 147, is boss-shaped.

Thus, as described with FIG. 12, in comparison to a case where the regulator, such as the harness regulator 147, is wall-shaped, a reduction can be made in the amount of resin material of the sensor holder, such as the holder 140, leading to a reduction in the cost of the device.

Aspect 5

According to Aspect 5, in the sensor holder of any of Aspects 1 to 3, the regulator, such as the harness regulator 147, is wall-shaped.

Thus, as described in the embodiment, in comparison to a case where the regulator is boss-shaped, the regulator can prevent the harness from being laid wrongly.

Aspect 6

According to Aspect 6, in the sensor holder of any of Aspects 1 to 5, the snap fitter 144 has an opposed face, such as an opposed face 144*b*, opposed to a side face of the sensor, such as the temperature detection sensor, held by the sensor holder, and the opposed face of the snap fitter 144 is farther away from the sensor than a side wall face, such as an inner wall face 140*c*, on a side of location of the snap fitter of the sensor holder, such as the holder 140, is.

Thus, as described in the embodiment, with the sensor, such as the temperature detection sensor, pushed to the side of location of the snap fitter by the regulation force of the regulator, such as the harness regulator 147, a claw 144*a* of the snap fitter 144 can catch the sensor firmly. Thus, the sensor can be favorably inhibited from coming off.

Aspect 7

According to Aspect 7, the sensor holder of any of Aspects 1 to 6, further includes a second regulator, such as a second harness regulator 148, that regulates the harness 126 in an opposite direction to a direction in which the sensor, such as the temperature detection sensor, is set to the sensor holder, such as the holder 140.

Thus, as described in the embodiment, when the leading end of the harness 126 is pulled in the opposite direction to the direction in which the temperature detection sub-sensor 123*b* is set, the second regulator, such as the second harness regulator 148, functions as a stopper. Thus, force in the opposite direction to the sensor setting direction can be inhibited from being applied to the sensor, such as the temperature detection sensor, through the harness 126. Thus, the sensor can be inhibited from coming off.

Aspect 8

According to Aspect 8, in the sensor holder of Aspect 7, the second regulator, such as the second harness regulator 148, overlaps the regulator, such as the harness regulator 147, in the direction in which the sensor is set to the sensor holder.

Thus, as described with FIGS. 13 to 15, the harness 126 is laid around the second regulator, such as the second harness regulator 148, while wrapping around the regulator, such as the harness regulator 147. Thus, even when the leading end of the harness 126 is pulled, the laying near the sensor of the harness 126 can be inhibited from being changed. Therefore, the regulator can regulate the harness 126 firmly, and the regulation of the regulator can be favorably inhibited from being released.

Aspect 9

According to Aspect 9, a unit, such as a fixing device 32, includes the sensor holder, such as the holder 140, of any of Aspects 1 to 8, and a sensor held by the sensor holder.

Thus, the sensor can be easily replaced and additionally the sensor can be inhibited from coming off.

Aspect 10

According to Aspect 10, in the unit of Aspect 9, with the unit, such as the fixing device 32, installed correctly, a claw 144*a* of the snap fitter 144 is located lower than the sensor, such as the temperature detection sensor, and an angle between a horizontal plane and a substrate face of the sensor is 60° or less.

Thus, as described in the embodiment, even in a case where the sensor tends to come off the holder 140 due to the self-weight of the sensor in a correct installed state, the sensor can be favorably inhibited from coming off.

Aspect 11

According to Aspect 11, in the unit of Aspect 9 or 10, the sensor, such as the temperature detection sensor, held by the sensor holder, such as the holder 140, is exposed outward from the unit, such as the fixing device 32.

Thus, as described in the embodiment, it can be visually verified whether or not the sensor, such as the temperature detection sensor, has been assembled correctly as a finished product. In addition, the sensor can be attached or detached from outside. Thus, the sensor can be easily replaced, leading to an enhancement in the workability of replacement.

Aspect 12

According to Aspect 12, the unit of any of Aspects 9 to 11, further includes a fixing device that fixes an image on a sheet, which includes: a fixing member, such as a fixing belt 61; a pressure member, such as a pressure roller 62, pressing the fixing member to form a fixing nip; and a heat source, such as a heater, that heats the fixing member, in which an image on a sheet is fixed to the sheet.

Aspect 13

According to Aspect 13, an image forming apparatus includes a fixing device that fixes an image on a sheet, the sensor holder of any of Aspects 1 to 8, and the sensor holder according to any of Aspects 1 to 8 holding the sensor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A sensor holder comprising:

a single snap fitter that holds a sensor; and a regulator that regulates a harness extending from the sensor by a regulation force such that the sensor is pushed to the snap fitter by the regulation force, wherein:

the snap fitter holds an end of the sensor in a direction orthogonal to a direction in which the harness extends from the sensor, the regulator abuts, from an opposite side to a side of location of the snap fitter in the direction orthogonal to the direction in which the harness extends from the sensor, on a part of the harness where the harness has at a predetermined distance from a connection point between the harness and the sensor and regulates movement of the harness to the opposite side to the side of location of the snap fitter due to elasticity of the harness in the direction orthogonal to the direction in which the harness extends from the sensor, the harness extending from the sensor includes a plurality of harnesses extending at predetermined intervals in the direction orthogonal to the direction in which the harness extends from the sensor, and, in the direction orthogonal to the direction in which the harness extends from the sensor, an abutment between the regulator and the harness is located closer to the snap fitter than a position is, the position being located at a center between: a connection point between the sensor and a harness coupled to the sensor closest to the snap fitter from among the plurality of harnesses; and a connection point between the sensor and a harness coupled to the sensor farthest away from the snap fitter from among the plurality of harnesses.

2. The sensor holder according to claim 1, wherein:

the regulator is boss-shaped.

3. The sensor holder according to claim 1, wherein:

the regulator is wall-shaped.

4. The sensor holder according to claim 1, further comprising:

a second regulator that regulates the harness in an opposite direction to a direction in which the sensor is set to the sensor holder.

5. The sensor holder according to claim 4, wherein:

the second regulator overlaps the regulator in the direction in which the sensor is set to the sensor holder.

6. A unit, comprising:

the sensor holder according to claim 1; and a sensor held by the sensor holder.

7. The unit according to claim 6, wherein:

the sensor held by the sensor holder is exposed outward from the unit.

8. The unit according to claim 1, further comprising:

a fixing device that fixes an image on a sheet, the fixing device including:

a fixing member;

a pressure member pressing the fixing member to form a fixing nip; and a heat source that heats the fixing member.

9. A sensor holder, comprising:

a single snap fitter that holds a sensor; and a regulator that regulates a harness extending from the sensor by a regulation force such that the sensor is pushed to the snap fitter by the regulation force, wherein:

the snap fitter has an opposed face opposed to a side face of the sensor held by the sensor holder, and the opposed face of the snap fitter is farther away from the sensor than a side wall face on a side of location of the snap fitter of the sensor holder is.

10. A unit, comprising:

a sensor; and a sensor holder, including:

a single snap fitter that holds the sensor; and a regulator that regulates a harness extending from the sensor by a regulation force such that the sensor is pushed to the snap fitter by the regulation force, wherein, with the unit installed correctly, a claw of the snap fitter is located lower than the sensor, and an angle between a horizontal plane and a substrate face of the sensor is 60° or less.

* * * * *